United States Patent [19]

Ludwig

[11] 4,010,721

[45] Mar. 8, 1977

[54] VACUUM DELAY/RELIEF VALVE

[75] Inventor: George Ludwig, Troy, Mich.

[73] Assignee: The Bendix Corporation, South Bend, Ind.

[22] Filed: Apr. 24, 1975

[21] Appl. No.: 571,163

[52] U.S. Cl. .......................... 123/117 A; 137/513.3

[51] Int. Cl.² ....................... F02P 5/10; F16K 21/02

[58] Field of Search .... 123/117 A, 115 R, 146.5 A; 137/513.3

[56] References Cited

UNITED STATES PATENTS

| | | | |
|---|---|---|---|
| 2,650,581 | 9/1953 | Short et al. | 123/117 A |
| 3,476,094 | 11/1969 | Rucins et al. | 123/117 A X |
| 3,678,907 | 7/1972 | Vartanian | 123/117 A |
| 3,699,936 | 10/1972 | Vartanian | 123/117 A |
| 3,729,132 | 4/1973 | Ludwig | 123/117 A X |

*Primary Examiner*—C. J. Husar
*Assistant Examiner*—Tony M. Argenbright
*Attorney, Agent, or Firm*—Ken C. Decker; William N. Antonis

[57] ABSTRACT

A device for use in an internal combustion engine for reducing emissions and for improving engine performance and economy having valve means for restricting air flow from the carburetor spark port to the vacuum advance cylinder at moderate acceleration to delay spark retard and for permitting unrestricted air flow at substantially full throttle acceleration to provide normal spark retard.

5 Claims, 2 Drawing Figures

VACUUM DELAY/RELIEF VALVE

The invention relates to internal combustion engines and, more particularly, to a device for controlling spark timing in the engine cycle.

BACKGROUND OF THE INVENTION

Internal combustion engines as used heretofore have provisions for advancing the spark discharge in the engine cycle when the vehicle is cruising and for retarding the spark discharge when the vehicle is accelerating in response to intake manifold pressure. It has been found that emissions are reduced and engine performance and economy are improved if the spark is not retarded during "crowd" conditions, that is, during moderate vehicle acceleration. However, during full throttle acceleration the spark must be retarded to avoid engine knock.

SUMMARY OF THE INVENTION

The present invention relates to a device which is installed on the engine between the spark port on the carburetor and the vacuum advance chamber on the distributor. The device delays spark retard at moderate vehicle acceleration and permits normal spark retard during substantially full throttle acceleration. This is accomplished by metering air flow from the carburetor spark port to the distributor vacuum advance chamber during moderate vehicle acceleration below a predetermined spark port pressure and by permitting unrestricted air flow from the spark port to the vacuum advance cylinder during substantially full throttle acceleration at and above the predetermined spark port pressure. This delays increase in pressure in the vacuum advance chamber during moderate vehicle acceleration and permits rapid increase in pressure in the vacuum advance chamber during substantially full throttle acceleration. Spark advance operates in the normal manner at all times.

The invention contemplates a device for use in an internal combustion engine for delaying spark retard during moderate vehicle acceleration and for providing normal spark retard during substantially full throttle acceleration, comprising a body having ports connected to a vacuum source responsive to throttle acceleration and to a distributor vacuum advance chamber on the engine, valve means for restricting air flow from the vacuum source to the vacuum advance chamber at moderate acceleration to delay spark retard and for permitting unrestricted air flow at substantially full throttle acceleration to provide normal spark retard.

DRAWING

FIG. 1 is a schematic diagram showing pertinent elements of an internal combustion engine and novel valve means constructed according to the invention for controlling spark retard, and FIG. 2 is a vertical section showing a valve constructed according to the invention for use in an internal combustion engine as shown in FIG. 1.

DETAILED DESCRIPTION OF THE INVENTION

Figure 2:
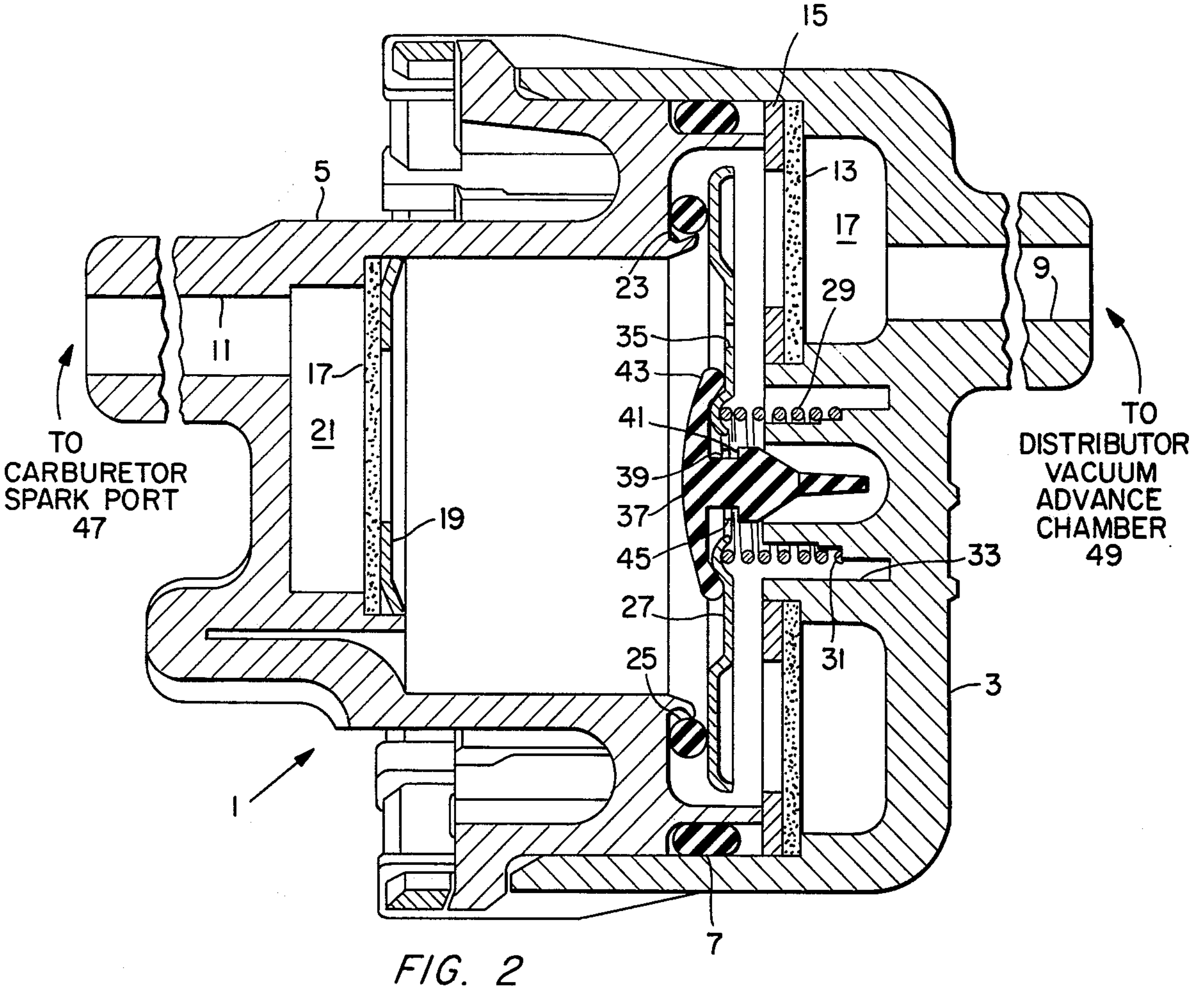

Referring to the drawing, the novel valve constructed according to the invention and shown in FIG. 2 has a body 1 enclosing a cylindrical chamber 2 and comprised of a cup-like outer cover 3 assembled on a cup-like inner cover 5 with an "O" ring 7 therebetween. Outer cover 3 has a port 9 and inner cover 5 has a port 11 connected to chamber 2. An air filter 13 of paper or other suitable material is retained by an annular retainer 15 in a cylindrical recess 17 in outer cover 3 connected to port 9.

A filter 17 of paper or other suitable material is retained by an annular washer 19 in a cylindrical recess 21 in inner cover 5 connected to port 11. Filters 13 and 17 filter air as it passes through chamber 2.

Inner cover 5 has an annular groove 23 formed therein for receiving an "O" ring 25. A disk 27 is urged into engagement with "O" ring 25 by a coil spring 29 having one end seated on the disk and the other end seated on a shoulder 31 in a cylindrical cavity 33 in outer cover 3. Disk 27 has a calibrated orifice 35 therethrough for restricting air flow to permit rate limited equalizaton of pressure between ports 9 and 11. The tension of spring 29 is such that when the pressure at port 11 is greater by a predetermined amount than at port 9 disk 27 is lifted off of "O" ring 25 in opposition to the force of spring 29 and air flow from port 11 to port 9 is unrestricted. In one embodiment the pressure differential is 2.5 inches Hg.

An umbrella valve 37 of rubber or other suitable material is positioned in an aperture 39 substantially centerally in disk 27. The valve has a shoulder 41 engaging one side of the disk adjacent the aperture and an umbrella portion 43 seated on the other side of the disk when the valve is closed. Vents 45 are provided in disk 27 adjacent shoulder 40 of umbrella valve 37 to permit air flow from port 9 to umbrella portion 43 of valve 37. When the pressure at port 9 is slightly higher than the pressure at port 11 the umbrella portion of valve 37 is lifted from its seat and air flows unrestricted from port 9 through vents 45 to port 11.

Figure 1:
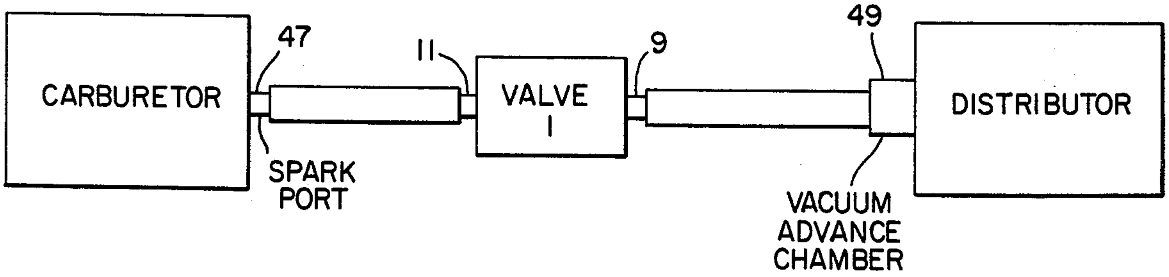

When the valve is used to control the spark timing in an internal combustion engine on a vehicle as described above, port 11 is connected to carburetor spark port 47 and port 9 is connected to distributor vacuum advance chamber 49 as shown in FIG. 1.

OPERATION

When the pressure at the carburetor spark port is less than a predetermined amount below the pressure at the distributor vacuum advance chamber disk 27 is seated on "O" ring 25 and air flow from port 11 to port 9 is restricted and spark retard is delayed. Orifice 35 then permits rate limited equalization of pressure from the carburetor spark port to the distributor vacuum advance chamber.

Disk 27 is lifted off of "O" ring 25 when the pressure at port 11 is the predetermined amount or higher than at port 9 to permit unrestricted air flow from port 11 to port 9. Umbrella valve 37 is lifted off of its seat on disk 27 when the pressure at port 9 is only slightly higher than at port 11 to permit unrestricted air flow from port 9 to port 11. With this arrangement when the differential pressure between the ports is the predetermined amount or greater, as in substantially full throttle acceleration, the spark retard operates in the normal manner, but when the pressure differential between the ports is less than the predetermined amount, as in moderate vehicle acceleration, spark retard is delayed. Spark advance operates in the normal manner at all times.

Operating the engine in this manner reduces emissions and improves engine performance and economy.

What is claimed is:

1. In an internal combustion engine having a vacuum source responsive to engine acceleration and a distributor vacuum advance chamber, a device for controlling communication between said vacuum source and said vacuum advance chamber to delay spark retard on moderate engine acceleration and to provide normal spark retard during substantially full throttle acceleration, said device comprising a housing having a first port communicated to said vacuum source and a second port communicated to said vacuum advance chamber, normally closed valve means responsive to the pressure differential between said ports to permit substantially uninhibited communication therebetween when the pressure level at said first port exceeds the pressure level at the second port by a predetermined amount, and flow restricting means permitting limited communication from said first port to said second port when said valve means is closed, said valve means including mechanism permitting substantially uninhibited communication from said second port to said first port when the pressure level at the second port is greater than the pressure level at the first port to thereby permit normal spark advance at all times.

2. The invention of claim 1:

said valve means including sealing means carried by said housing, a disc slidable in said housing, and a spring yieldably urging the disc into sealing engagement with said sealing means.

3. The invention of claim 1:

said flow restricting means being an orifice in said disc.

4. The invention of claim 2:

said mechanism including an umbrella valve to permit unrestricted communication between said ports when the pressure level at the second port is greater than the pressure level at the first port to permit normal spark advance at all times.

5. The invention of claim 4:

said valve means including sealing means carried by said housing, a disc slidable in said housing, and a spring yieldably urging the disc into sealing engagement with said sealing means, said umbrella valve being carried by said disc.

* * * * *